United States Patent

Werner

[15] 3,673,473

[45] June 27, 1972

[54] MAGNETIC TAPE UNIT REEL MOTOR TENSION CONTROL

[72] Inventor: Allen J. Werner, Boulder, Colo.

[73] Assignee: International Business Machines Corporation, Armonk, N.Y.

[22] Filed: Oct. 19, 1970

[21] Appl. No.: 81,993

[52] U.S. Cl. ....................318/7, 318/6, 242/75.51

[51] Int. Cl. ....................B65h 23/20, H02p 5/00

[58] Field of Search ....................318/6, 7; 242/75.51

[56] References Cited

UNITED STATES PATENTS 3,370,802 2/1968 Wooldridge et al....................318/7 X

*Primary Examiner*—T. E. Lynch

*Attorney*—Hanifin and Jancin and Francis A. Sirr

[57] ABSTRACT

A magnetic tape unit having a machine reel, a file reel, a machine vacuum column, a file vacuum column and a reversible capstan disposed between the vacuum columns. An upper and a lower tape loop position sensor is located in each column. These sensors control the associated reel motor to institute a brake mode of operation therefore when the loop is between the sensors, and to institute a drive mode of operation, to move tape in the same direction as the capstan is moving tape, whenever the loop is in danger of being pulled out of a column or of being buttoned in a column.

A digital capstan tachometer is driven by the capstan, and two digital tape tachometers, one located on each reel-side of a vacuum column, are driven by the tape adjacent the reel. The outputs of the tape tachometers are compared to the output of the capstan tachometer to originate a reel-fast or a reel-slow signal for each reel. These signals are utilized to modify control of the associated reel motor in a manner to inhibit the drive mode and institute a coast mode upon the presence of a reel-fast signal, and to inhibit the brake mode and institute a coast mode if a reel-slow signal occurs when the capstan is rotating in a direction to move tape out of the associated vacuum column.

6 Claims, 4 Drawing Figures

FIG. 1

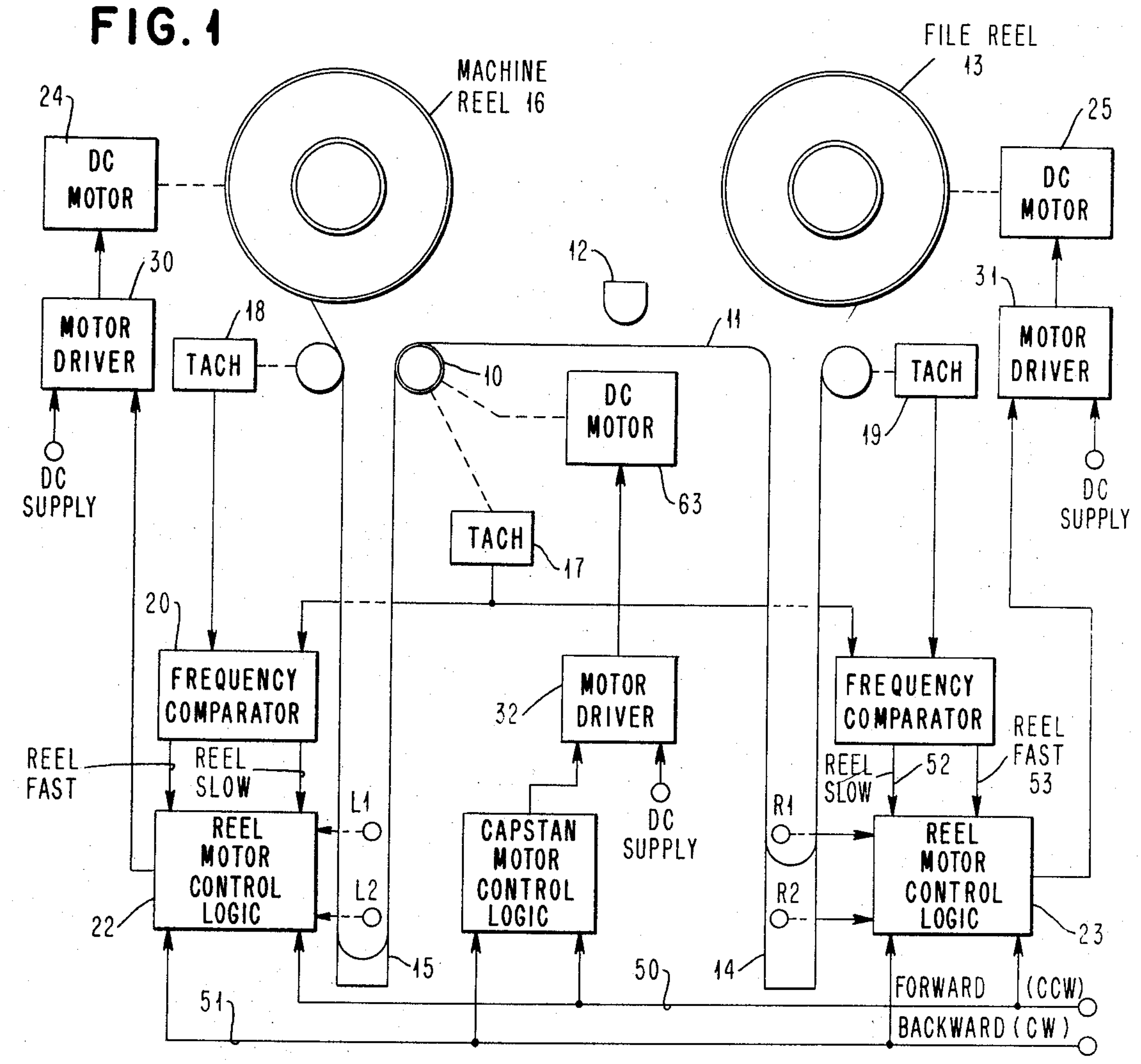

FIG. 2

| MACHINE REEL SPEED | MACHINE REEL MOTOR | | | | FILE REEL MOTOR | | | | CAPSTAN DIRECTION |
|---|---|---|---|---|---|---|---|---|---|
| | CW | | CCW | | CCW | | CW | | |
| | SLOW | FAST | SLOW | FAST | SLOW | FAST | SLOW | FAST | FILE REEL SPEED |
| ABOVE L1 | ↓ | C | B | B | ↓ | C | B | B | ABOVE R1 |
| L1-L2 | C | B | B | B | C | B | B | B | R1-R2 |
| BELOW L2 | C | B | ↑ | C | C | B | ↑ | C | BELOW R2 |

KEY:
C = COAST
B = BRAKE
↑ = ENERGIZE REEL MOTOR TO PULL TAPE OUT OF COLUMN
↓ = ENERGIZE REEL MOTOR TO MOVE TAPE INTO COLUMN

INVENTOR
ALLEN J. WERNER
BY [signature]
ATTORNEY

MAGNETIC TAPE UNIT REEL MOTOR TENSION CONTROL

BACKGROUND AND SUMMARY OF THE INVENTION

The prior art teachings relating to magnetic tape units deal at length with the use of tape buffers, such as vacuum columns, to isolate the low inertia capstan from the high inertia reels.

In accordance with prior art teachings, capstan motion is controlled to produce the required tape movement for data processing and the like. The capstan must provide constant speed movement of the tape, with fast acceleration, deceleration and dynamic direction reversal, all as demanded by an associated data processing unit.

The reel motors, on the other hand are controlled in accordance with the quantity of tape in an associated buffer, such as the length of the tape loop in the vacuum columns, to maintain an optimum quantity of tape in the buffers. Generally, the optimum tape quantity is determined by the direction in which tape is being moved by the capstan and by the contingent possibility that the capstan may suddenly reverse direction. When this happens, the tape must not pull out of the column, or bottom in the column.

The prior art discloses structure which provides both continuous analog measurement of the tape loop position by means of sensors, such as strain gages, in the columns, and discrete digital measurement of the loop position, as by pressure sensors or photocells which are spaced along the column. These structures include electronic circuits whose output signals indicate both the position of the loop and the direction in which the loop is moving.

A specific example of prior art of this general type provides reel motor control by the analog summing of a plurality of DC signals a first DC signal providing a polarity to indicate which direction the tape is moving adjacent the capstan. Other DC signals provide variable magnitudes to indicate the position of the tape loop in the vacuum columns. Yet other DC signals provide variable magnitudes to indicate the speed of the tape adjacent a reel, and provide a reversible polarity to indicate the direction of tape movement at this point. The basic control of the reel motor is the last mentioned signal which is indicative of tape speed and direction adjacent the reel. This basic control system is then further controlled by the signal indicating the direction of tape movement adjacent the capstan. The signals derived from the loop position sensor may further adjust the basic control system, depending upon loop position. In this system, the reel motor never coasts but is continuously energized in one manner or another.

Another prior art teaching also dealing with analog control of the reel motor utilizes DC analog tachometers which are driven by the capstan and by the tape adjacent each of the two reels. A speed servo controls each reel motor and receives the major component of its input signal from the variable magnitude and reversible polarity capstan tachometer, to thus slow the reel speed to the capstan speed. The variable magnitude and reversible polarity signal from the tape tachometers provides an additional signal which is summed with the capstan signal to cause the tape speed at the reel to slightly exceed the tape speed at the capstan. A DC signal is derived from the vacuum column and is summed with the two above-mentioned signals to cause the loop to oscillate back and forth across a given loop sensor. Here again, the reel motor never coasts.

The present invention is distinct from the prior art in that the present invention provides a position servo to control the reel motors, whose input is derived from discrete sensors responsive to the position of the tape in the column. This basic servo can provide only one of two outputs, a drive mode or a dynamic brake mode, to control the reel motor. A further means is associated with the tape as it moves into and out of each column to differentially sense the speed of the tape on opposite sides of the column and to provide a signal indicating that the quantity of tape in the column is increasing or is decreasing. This signal is connected to the position control servo to perform two functions, (1) inhibit the brake mode whenever the quantity of tape in the column is decreasing, and (2) inhibit the drive mode whenever the tape speed adjacent a reel is high.

More specifically, the present invention controls the reel motors by position servos having a binary drive-dynamic brake output. The basic servo input control signal is a discrete position signal having three possible states. This signal is derived from two vacuum column position sensors which are spaced in each column and divide each column into three zones. The position servo is effective to institute two modes of motor operation.

The position servo control of each reel motor is modified in a unique manner by means of digital tachometers which are responsive to the tape speed on opposite sides of the vacuum column. Digital tachometers are preferred since these tachometers have low inertia and do not appreciably add to the load to be moved by the capstan and the reel motors.

The variable frequency outputs of these tachometers, the frequency of which increases as tape speed increases, are compared to provide a binary signal having two discrete levels, one of which (reel slow) indicates that the tape on the reel side of the column is moving slower than is the tape on the capstan side of the column, and the other of which (reel fast) indicates that the tape on the reel side is moving faster than is the tape on the capstan side.

This binary reel fast-reel slow signal is connected to the position servo to inhibit the reel motor drive mode, and thus institute a coast mode, whenever a reel-fast condition occurs, and to inhibit the reel motor brake mode, and thus institute a coast mode, if a reel-slow condition occurs when the capstan is moving tape out of the associated vacuum column.

The foregoing and other features, and advantages of the invention will be apparent from the following more particular description of a preferred embodiment of the invention, as illustrated in the accompanying drawings.

BRIEF DESCRIPTION OF THE DRAWINGS

FIG. 1 is a schematic view of a magnetic tape unit embodying the invention;

FIG. 2 is a chart showing the order of control for the two reel motors of FIG. 1;

DESCRIPTION OF THE PREFERRED EMBODIMENT

Figure 3:
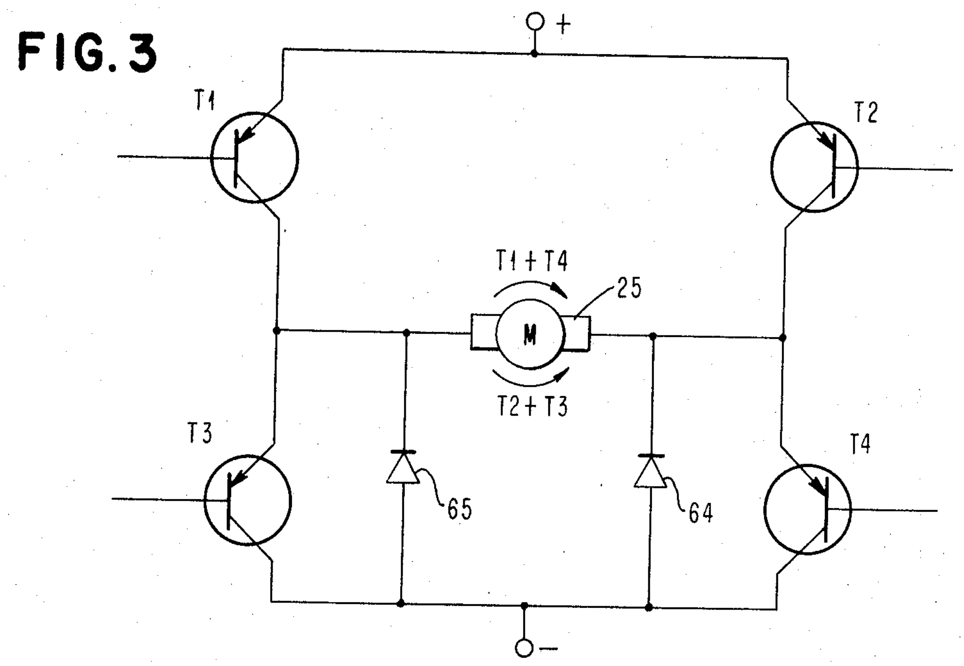
FIG. 3 is an example of a motor driver which may be used in the structure of FIG. 1, disclosing specifically the file reel motor driver.

The motor control system of this invention provides digital control of the reel motor of a magnetic tape unit by means of input signals indicating (1) the direction of capstan rotation, (2) a comparison of the tape speed on opposite sides of an associated vacuum column buffer, and (3) the zone position of the tape loop within the vacuum column.

FIG. 1 schematically shows a magnetic tape unit having a single bidirectionally rotatable capstan 10 which moves tape 11 across read/write head 12. The tape is stored on file reel 13. During forward movement of the tape, caused by counterclockwise rotation (CCW) of the capstan, tape leaves the file reel, forms a loop in file vacuum column 14, passes the head, forms a loop in machine vacuum column 15 and is wound on machine reel 16.

The speed of the tape on the capstan side of a vacuum column is sensed by digital tachometer 17. The speed of the tape on the reel sides of each vacuum column is sensed by digital tachometers 18 and 19.

Frequency comparators 20 and 21 differentially compare the speed of the tape on opposite sides of the vacuum columns and originate a binary signal having two possible states, "reel slow" or "reel fast" when the speed of the tape adjacent a reel is slower or faster than the speed of the tape at the capstan. When this signal is compared to the direction of capstan rotation, as determined by the voltage level of conductors 50 and 51, a logical decision can be made as to whether the quantity of tape in a column is increasing or decreasing.

Reel motor control logic circuits 22 and 23 control machine reel driver 30 and motor 24 and file reel driver 31 and motor 25 in accordance with the control order shown in FIG. 2.

By way of explanation of the table shown in FIG. 2, when the capstan is rotating in a direction to move tape out of a given column ("CW" for the machine column and "CCW" for the file column), a transition of that column's frequency comparator from "reel slow" to "reel fast" has the effect of inhibiting drive and instituting coast, but only if that column's loop is above a given position sensor (L1 for the machine column and R1 for the file column). If the loop had been below the required given position sensor (L1 or R1), the transition from "reel slow" to "reel fast" would have had the effect of terminating the brake inhibit, thus reinstituting the brake mode.

When the capstan is moving tape into a given column ("CCW" for the machine column and "CW" for the file column), a transition of that column's frequency comparator from "reel slow" to "reel fast" has the effect of inhibiting drive and instituting coast, but only if that column's loop is below a given position sensor (L2 for the machine column and R2 for the file column). A critical feature of the present invention is seen when considering what would have happened had the loop been above the required given position sensor (L2 or R2). In this case (as distinguished from the above-mentioned case where the capstan is moving tape out of a given column), the reel motor remains in a brake mode independent of stature of "reel slow" or "reel fast" whenever the loop is above the required given position sensor.

Thus, it can be seen that whenever a reel motor is in a drive mode and a transition from "reel slow" to "reel fast" occurs, the drive mode is inhibited and a coast mode is substituted therefor. However, when a reel motor is in a brake mode, the brake mode is inhibited and a coast mode is substituted therefor only if two conditions are satisfied, namely, a "reel fast" to "reel slow" transition must occur, and the capstan must be rotating in a direction to be removing tape from the column associated with that reel motor.

FIG. 2 deals with only a forward or a backward rotational command for the capstan. When the capstan receives a stop command, as by the absence of either a forward or a backward command on lines 50 and 51, the control order for each reel motor is a brake mode so long as the tape loop is in the center zone of its column (L1–L2 or R1–R2), and for a drive mode in a direction to move tape into the center zone whenever the loop moves out of the center zone.

The various structural components shown in FIG. 1 may take many forms, as will be appreciated by those skilled in the art. Therefore, the following description deals only with a fundamental representation and description of this structure.

Frequency comparators 20 and 21 may take a variety of forms. In essence, the comparators determine which of the two independent digital tachometers, connected to the two comparator inputs, is producing the higher frequency output signal. For example, considering comparator 21, should the tape speed at the capstan be higher than the tape speed at the file reel, the output frequency of tachometer 17 is higher than the output frequency of tachometer 19 and an output is provided on the reel-slow output line 52 of comparator 21. Had the reverse been true, a reel-fast output would have appeared as line 53.

FIG. 3 discloses a motor driver such as may be utilized as reel motor drivers 30 and 31 and capstan motor driver 32. These drivers consist essentially of a switching structure which, as commanded by its associated motor control logic, is effective to connect a DC motor to a source of DC supply. In FIG. 3, file reel motor 25 is shown connected in a four-transistor bridge network. When transistors T1 and T4 are conductive, motor 25 is energized to turn clockwise to move tape into file column 14. When only transistor T3 is conductive, a dynamic brake circuit for clockwise motor rotation is effective to short the motor armature through transistor T3 and diode 64. When only transistor T4 is conductive, a coast mode of operation is instituted for clockwise rotation.

When transistors T2 and T3 are conductive, motor 25 is energized to turn counterclockwise to pull tape out of file column 14. When only transistor T4 is conductive, a dynamic brake circuit for counterclockwise motor rotation is effective to short the motor armature through transistor T4 and diode 65. When only transistor T3 is conductive, a coast mode of operation is instituted for counterclockwise rotation.

Figure 4:
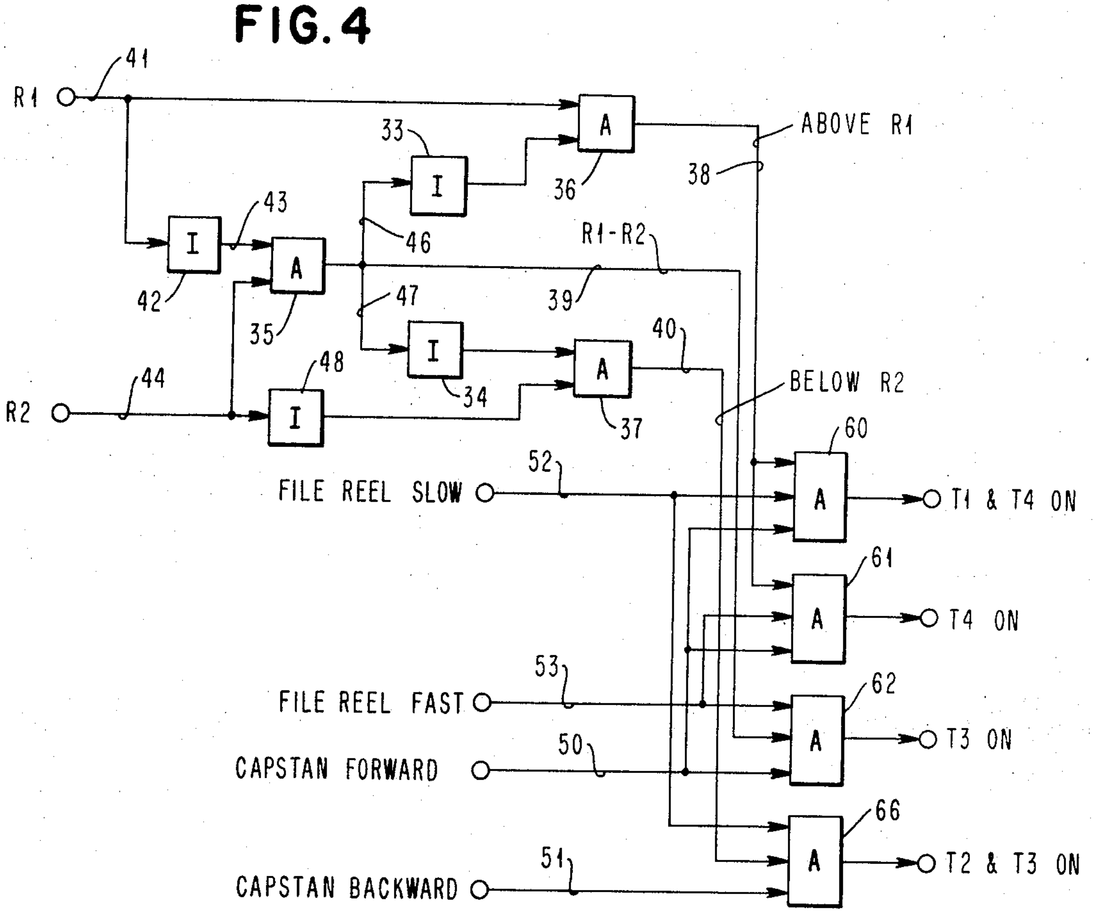
FIG. 4 is an example of a motor control logic which may be used in the structure of FIG. 1, disclosing specifically a portion of the file reel motor control logic.

The transistor network of FIG. 3 may be controlled by reel motor control logic network, a portion of which is disclosed in simplified form in FIG. 4. In this figure, AND gates 35, 36 and 37 are connected to file column sensors R1 and R2 to selectively provide the three zone outputs of FIG. 2 on conductors 38, 39 and 40. An output on conductor 38 indicates that the tape loop is above sensor R1. An output on conductor 39 indicates that the tape loop is in between sensore R1 and R2. An output on conductor 40 indicates that the tape loop is below sensor R2.

Sensors R1 and R2 may be pressure responsive sensors in the form of switches which provide output signals in accordance with the pressure at the sensor. This pressure may be either atmospheric or vacuum, as the tape loop is below or above the sensor. For example, should the tape loop be below a given sensor, this sensor will be subjected to atmospheric pressure and can for example, provide a negative potential output signal from that respective sensor. When the tape loop is above that sensor, the sensor is subjected to a vacuum and the output signal then provided may be of a positive potential.

Assuming the tape loop is a shown in FIG. 1, namely in the zone R1–R2, the output from sensor R1 is negative and the output from sensor R2 is positive. The negative signal on conductor 41 is inverted by inverter 42 to provide a positive signal at conductor 43 and to one input of gate 35. Conductor 44, now positive, is connected to the other input of gate 35. Thus gate 35 provides a positive signal on conductor 39, indicating that the tape loop is in zone R1–R2.

The positive signal on conductor 39 is inverted by inverter 33 and 34 and is effective to inhibit gates 36 and 37.

Should the tape loop move below sensor R2, the potential level of conductor 44 goes negative, causing the output on conductor 39 to go negative. The negative signal on conductor 39 is inverted to apply a positive input to gate 37. The negative signal on conductor 44 is also inverted and a second positive input is applied to gate 37. Thus the output of gate 37, conductor 40, goes positive, indicating that the tape loop is now in the zone identified as below—R2.

FIG. 4 discloses only a portion of the file reel motor control logic 23. Conductor 50 is positive when forward (CCW) rotation of capstan 10 is desired. When backward rotation of the capstan is desired, conductor 51 is positive. File reel slow conductor 52 and file reel fast conductor 53 provide positive signals respectively when the tape speed at the file reel is slower or faster than the tape speed at the capstan.

Referring to the file reel motor control order FIG. 2, by way of example consider the condition wherein the tape in file vacuum column 14 is above sensor R1, the file reel is slow, and the capstan direction is forward (CCW). Since the tape loop is in the zone above R1, conductor 38 provides a first positive input to AND gate 60. With the file reel slow conductor 52 provides a second positive input to AND gate 60. Since the capstan is rotating in a forward direction, conductor 50 provides the third positive input to AND gate 60. The output of gate 60 now goes positive and is effective to bias transistors T1 and T4 of FIG. 4 into conduction, causing file reel motor 25 to rotate in a clockwise direction to move tape from the reel into file column 14.

As the file reel picks up speed, a transition from "reel slow" to "reel fast" occurs while the tape loop remains in the zone above R1. Conductor 52 now goes negative and conductor 53 goes positive. In this case, conductor 38 provides a first positive input to AND gate 61. Since the rotation of the capstan remains in the forward direction, conductor 50 provides a second positive input to AND gate 61. With the file reel now moving tape faster than the capstan is moving tape, conductor 53 provides a third positive input to AND gate 61. Thus, the output of AND gate 61 goes positive and is effective to render only transistor T4 conductive. With only transistor T4 conductive, a coast mode is instituted for motor 25, this being the required mode of operation as shown in FIG. 2.

As the file reel continues to pick up speed, the tape loop moves down below sensor R1 and into zone R1–R2. Conductor 39 now goes positive, applying a first input to AND gate 62. Since the capstan is still rotating in a forward direction, and since the "reel fast" output still exists, two further positive inputs to gate 62 cause the output of the gate to go positive. The output of gate 62 renders transistor T3 conductive. Transistor T3 and diode 64 form a circuit shunting the armature of motor 25 and institute a dynamic brake mode, as noted in FIG. 2.

By way of further explanation, consider the condition wherein the tape loop in the file column is in the zone identified as below-R2, "file reel slow" is present and the capstan is rotating in a backward direction (CW). Conductor 40 now provides a first positive input to AND gate 66, conductor 52 provides a second positive input to this AND gate, and conductor 51 provides the third positive input to AND gate 66. The output of AND gate 66 is then effective to render transistors T2 and T3 conductive. With transistors T2 and T3 conductive, file motor 25 is energized to rotate in a counterclockwise direction to thus pull tape out of column 14, as noted in FIG. 2.

FIG. 4 is shown by way of a simplified example of a structure which may be utilized to accomplish the control logic to control reel motors 24 and 25. FIG. 4 does not accomplish all of the modes of operation of file motor 25 identified in FIG. 2. However, the teaching of FIG. 4 can be extended to accomplish the requirements of FIG. 2, as will be apparent to those skilled in the art.

Also, the motor control logic for capstan motor likewise is accomplished by the use of gates which respond to the signals on lines 50 and 51 to control driver 32 and produce the required direction of capstan rotation.

While the invention has been particularly shown and described with reference to a preferred embodiment thereof, it will be understood by those skilled in the art that various changes in form and details may be made therein without departing from the spirit and scope of the invention.

What is claimed is:

1. In a magnetic tape unit having tape buffer means, reversible capstan means disposed to supply tape to one side of said buffer means, and reversible reel means disposed to supply tape to the other side of said buffer means, the improvement comprising:

reel control means responsive to the quantity of tape in said buffer means and to the direction of rotation of said capstan means, and connected in controlling relation to said reel means;

said reel control means being effective to maintain a minimum quantity of tape in said buffer means when said capstan means is removing tape therefrom by instituting a drive mode of operation for said reel means to move tape into said buffer means when the quantity of tape in said buffer means is less than said minimum quantity, and to instituting a brake mode of operation for said reel means when the quantity of tape in said buffer means is more than said minimum quantity;

said reel control means being effective to maintain a maximum quantity of tape in said buffer means when said capstan means is moving tape thereinto, by instituting a drive mode of operation for said reel means to remove tape from said buffer means when the quantity of tape is greater than said maximum quantity, and to institute a brake mode of operation when the quantity of tape in said buffer means is less than said maximum quantity; and means responsive to the direction in which the quantity of tape in said buffer means is changing, including means differentially sensing the tape speed on opposite sides of said buffer means, connected to modify the operation of said reel control means to inhibit the drive mode of operation of said reel means whenever said reel means is moving tape faster than said capstan means is moving tape and to additionally inhibit the brake mode of operation of said reel means when said reel means is moving tape slower than said capstan means is moving tape and said capstan means is removing tape from said buffer means.

2. A magnetic tape unit as defined in claim 1 wherein the inhibiting of said drive mode and the inhibiting of said brake mode institutes a coast mode of operation of said reel means.

3. A magnetic tape unit as defined in claim 2 wherein said means responsive to the direction in which the quantity of tape in said buffer means is changing includes a first tachometer driven by said capstan, a second tachometer driven by the tape on the reel means side of said buffer means, and means comparing the outputs of said tachometers.

4. A magnetic tape unit as defined in claim 3 wherein said first and second tachometers are digital tachometers whose output frequency increases with the speed of rotation thereof, and wherein said comparing means compares said output frequencies to originate a reel-fast or a reel-slow output.

5. A magnetic tape unit having a vacuum column, a tape reel located on one side of the vacuum column, a motor connected to said reel, and a bidirectionally rotatable capstan located on the other side of the vacuum column, the improvement comprising:

sensing means including two position sensors, providing binary outputs, spaced along the vacuum column to define an upper, an intermediate and a lower zone therein;

a binary signal source indicative of the direction of capstan rotation;

logic means controlled by the binary outputs of said position sensors and by the direction of rotation of the capstan, and connected to control the reel motor to institute a drive mode of operation for the motor in a direction to move tape into said column when the loop is in the upper zone and the capstan is removing tape from said column; to institute a drive mode of operation for the motor in a direction to move tape out of said column when the loop is in the lower zone and the capstan is moving tape into said column; and to institute the brake mode of operation for the motor when the loop is in the intermediate zone; and speed comparing means responsive to the speed of the tape on the reel side and on the capstan side of the vacuum column, and providing a binary output which is connected to control said logic means, said binary output having one state which is effective to inhibit said drive modes when the speed of the tape on the reel side of the vacuum column is the higher speed, and having a second state which is compared to the binary signal source indicative of the direction of capstan rotation to selectively inhibit said brake mode when the speed of the tape on the capstan side of the vacuum column is the higher speed and the direction of rotation of said capstan is such as to remove tape from the vacuum column;

said speed comparing means including first and second digital tachometers, one of which is driven in accordance with the speed of the tape adjacent the reel and the other of which is driven in accordance with the speed of the tape at the capstan, and frequency comparator means having input means connected to said tachometer and providing said binary output.

6. A magnetic tape unit having a file reel, a motor connected thereto, a file vacuum column adjacent said file reel, a machine reel, a motor connected thereto, a machine vacuum column adjacent said machine reel, and capstan means disposed intermediate said vacuum columns, the improvement comprising:

means providing a binary output signal indicative of forward or backward rotation of said capstan means;

first and second position sensing means, including two spaced position sensors in each of said vacuum columns to define an upper, an intermediate and a lower zone in each column, each of said sensors providing a binary output in accordance with the loop position;

first and second logic means controlled by said first and second position sensing means respectively and by the direction in which said capstan means is moving tape;

means connecting said first and second logic means in controlling relation to said file reel motor and said machine reel motor to institute the following control order for said motors when said capstan is moving tape in a forward direction from said file reel to said machine reel;

1. institute a brake mode for said machine reel motor when the loop of tape in said machine vacuum column is above said lower zone,
2. institute a drive mode for said machine reel motor in a direction to remove tape from said machine vacuum column when the loop of tape in said machine vacuum column is in said lower zone,
3. institute a brake mode for said file reel motor when the loop of tape in said file vacuum column is below said upper zone, and
4. institute a drive mode for said file reel motor in a direction to move tape into said file vacuum column when the loop of tape in said file vacuum column is in said upper zone, first and second speed comparing means including a first digital tachometer driven in accordance with the speed of the tape adjacent said capstan means, second and third digital tachometers driven in accordance with the speed of the tape adjacent said file reel and said machine reel respectively, and first and second frequency comparator means each having one input connected to one of said second and third tachometers, said frequency comparator means providing a binary output indicative of the speed of the tape adjacent a reel as compared to the speed of the tape adjacent the capstan means, said first and second speed comparing means being responsive to the difference between the speed of the tape on opposite sides of said file and machine vacuum columns respectively, and connected to said first and second logic means, respectively, to inhibit the drive mode of that reel motor whose tape speed on the reel side of its vacuum column is the higher speed, and to inhibit the brake mode of said file reel motor when the tape speed on the capstan means side of said file vacuum column is the higher speed; and means connecting said first and second logic means in controlling relation to said file reel motor and said machine reel motor to institute the following control order for said motors when said capstan is moving tape in a backward direction from said machine reel to said file reel;

1. institute a brake mode for said machine reel motor when the loop of tape in said machine vacuum column is below said upper zone,
2. institute a drive mode for said machine reel motor in a direction to move tape into said machine vacuum column when the loop of tape in said machine vacuum column is in said upper zone,
3. institute a brake mode for said file reel motor when the loop of tape in said file vacuum column is above said lower zone, and
4. institute a drive mode for said file reel motor in a direction to remove tape from said file vacuum column when the loop of tape in said file vacuum column is in said lower zone, said first and second comparing means being additionally effective to inhibit the brake mode of said machine reel motor when the tape speed on the capstan means side of said machine vacuum column is the higher speed.

* * * * *